(12) United States Patent
Pope et al.

(10) Patent No.: US 8,005,916 B2
(45) Date of Patent: Aug. 23, 2011

(54) USER-LEVEL STACK

(75) Inventors: Steve L. Pope, Cambridge (GB); David J. Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 1029 days.

(21) Appl. No.: 11/111,481

(22) Filed: Apr. 21, 2005

(65) Prior Publication Data

US 2005/0226165 A1      Oct. 13, 2005

(30) Foreign Application Priority Data

Apr. 21, 2004   (GB) .................................. 0408876.1

(51) Int. Cl.
*G06F 15/167* (2006.01)
(52) U.S. Cl. ..................... 709/212; 709/213; 709/216
(58) Field of Classification Search .................. 709/212, 709/213
See application file for complete search history.

(56) References Cited

U.S. PATENT DOCUMENTS

| | | | |
|---|---|---|---|
| 2,545,194 A | 3/1951 | Colburn et al. |
| 3,491,031 A | 1/1970 | Stoneburner |
| 3,594,983 A | 7/1971 | Yearout |
| 3,738,084 A | 6/1973 | Simonet et al. |
| 4,005,708 A | 2/1977 | Netteland et al. |
| 4,539,189 A | 9/1985 | Starkston et al. |
| 4,668,255 A | 5/1987 | Govind |
| 4,675,309 A | 6/1987 | Hirai et al. |
| 4,810,266 A | 3/1989 | Zinnen et al. |
| 4,822,383 A | 4/1989 | Brose et al. |
| 4,999,175 A | 3/1991 | Vansant et al. |
| 5,281,254 A | 1/1994 | Birbara et al. |

(Continued)

FOREIGN PATENT DOCUMENTS

CN      1388455 A      1/2003

(Continued)

OTHER PUBLICATIONS

Riddoch, David et al.; "Distributed Computing With the CLAM Network"; Laboratory for Communications Engineering, Cambridge, England; SIGCOMM 2002, 13 pages.

(Continued)

*Primary Examiner* — Kevin Bates
*Assistant Examiner* — Mohammed Ahmed
(74) *Attorney, Agent, or Firm* — Warren S. Wolfeld; Haynes Beffel & Wolfeld LLP

(57) ABSTRACT

A method for transmitting data by means of a data processing system, the system being capable of supporting an operating system and at least one application and having access to a memory and a network interface device capable of supporting a communication link over a network with another network interface device, the method comprising the steps of: forming by means of the application data to be transmitted; requesting by means of the application a non-operating-system functionality of the data processing system to send the data to be transmitted; responsive to that request: writing the data to be transmitted to an area of the memory; and initiating by means of direct communication between the non-operating-system functionality and the network interface device a transmission operation of at least some of the data over the network; and subsequently accessing the memory by means of the operating system and performing at least part of a transmission operation of at least some of the data over the network by means of the network interface device.

63 Claims, 6 Drawing Sheets

U.S. PATENT DOCUMENTS

| | | | |
|---|---|---|---|
| 5,376,614 A | 12/1994 | Birbara et al. | |
| 5,462,908 A | 10/1995 | Liang et al. | |
| 5,492,683 A | 2/1996 | Birbara et al. | |
| 5,518,626 A | 5/1996 | Birbara et al. | |
| 5,535,416 A * | 7/1996 | Feeney et al. | 710/14 |
| 5,740,467 A | 4/1998 | Chmielecki, Jr. et al. | |
| 5,876,488 A | 3/1999 | Birbara et al. | |
| 6,274,108 B1 | 8/2001 | Fujii et al. | |
| 6,332,195 B1 | 12/2001 | Green et al. | |
| 6,334,162 B1 | 12/2001 | Garrett et al. | |
| 6,364,938 B1 | 4/2002 | Birbara et al. | |
| 6,397,316 B2 | 5/2002 | Fesas, Jr. | |
| 6,799,220 B1 * | 9/2004 | Merritt et al. | 709/238 |
| 6,865,672 B1 | 3/2005 | Carmeli | |
| 6,898,638 B2 * | 5/2005 | Frazier et al. | 709/232 |
| 7,308,509 B2 * | 12/2007 | Warschko et al. | 709/250 |
| 2002/0087912 A1 * | 7/2002 | Kashyap | 714/13 |
| 2002/0118703 A1 | 8/2002 | O'Neill et al. | |
| 2002/0133620 A1 * | 9/2002 | Krause | 709/238 |
| 2003/0041177 A1 * | 2/2003 | Warschko et al. | 709/310 |

FOREIGN PATENT DOCUMENTS

| | | |
|---|---|---|
| EP | 1376372 A2 | 1/2004 |
| JP | 63059322 | 3/1988 |
| JP | 02187153 | 7/1990 |

OTHER PUBLICATIONS

Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.

Pratt, Ian et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.

von Eicken, Thorsten, et al., "Evolution of the Virtual Interface ARchitecture" Computer, IEEE Service Center, Los Alamitos, CA vol. 31, No. 11, Nov. 1998, 61-68.

Mansley, Kieran, "Engineering a User-Level TCP for the Clan Network," Laboratory for Communications Engineering, University of Cambridge, Cambridge, England, Proceedings of the ACM SIGCOMM 2003 Workshops.

Compaq Computer Corp., Intel Corporation, Microsoft Corporation, . "Virtual Interface Architecture Specification," Version 1.0, Dec. 16, 1997.

PCI Special Interest Group, "PCI-X Addendum to the PCI Local Bus Specification," Rev. 1.0a, Jul. 24, 2000.

Chinese Office Action dated Jan. 25, 2008.

Gordon E. Moore; Electronics, vol. 38, No. 8, pp. 114-117, 1965, Apr. 19, 1965.

Jack B. Dennis and Earl C. Van Horn; Communications of the ACM, vol. 9, No. 3, pp. 143-155, Mar. 1966.

Marvin Zelkowitz; Communications of the ACM, vol. 14, No. 6, p. 417-418, Jun. 1971.

J. Carver Hill; Communications of the ACM, vol. 16, No. 6, p. 350-351, Jun. 1973

F.F. Kuo; ACM Computer Communication Review, vol. 4 No. 1, Jan. 1974.

Vinton Cerf, Robert Kahn; IEEE Transactions on Communications, vol. COM-22, No. 5, pp. 637-648, May 1974.

V. Cerf, et al.; ACM Computer Communication Review, vol. 6 No. 1, p. 1-18, Jan. 1976.

Robert M. Metcalfe and David R. Boggs; Communications of the ACM, vol. 19, Issue 7, pp. 395-404, Jul. 1976.

P. Kermani and L. Kleinrock; Computer Networks, vol. 3, No. 4, pp. 267-286, Sep. 1979.

John M. McQuillan, et al.; Proceedings of the 6th Data Communications Symposium, p. 63, Nov. 1979.

Andrew D. Birrell, et al.; Communications of the ACM, vol. 25, Issue 4, pp. 260-274, Apr. 1982.

Ian M. Leslie, et al.; ACM Computer Communication Review, vol. 14, No. 2, pp. 2-9, Jun. 1984.

John Nagle; ACM Computer Communication Review, vol. 14, No. 4, p. 11-17, Oct. 1984.

Robert M. Brandriff, et al.; ACM Computer Communication Review, vol. 15, No. 4, Sep. 1985.

C. Kline; ACM Computer Communication Review, vol. 17, No. 5, Aug. 1987.

Christopher A. Kent, Jeffrey C. Mogul; ACM Computer Communication Review, vol. 17, No. 5, pp. 390-401, Oct. 1987.

Gary S. Delp, et al.; ACM Computer Communication Review, vol. 18, No. 4, p. 165-174, Aug. 1988.

David R. Boggs, et al.; ACM Computer Communication Review, vol. 18, No. 4, p. 222-234, Aug. 1988.

H. Kanakia and D. Cheriton; ACM Computer Communication Review, vol. 18, No. 4, p. 175-187, Aug. 1988.

V. Jacobson; ACM Computer Communication Review, vol. 18, No. 4, p. 314-329, Aug. 1988.

David D. Clark; ACM Computer Communication Review, vol. 18, No. 4, pp. 106-114, Aug. 1988.

Paul V. Mockapetris, Kevin J. Dunlap; ACM Computer Communication Review, vol. 18, No. 4, pp. 123-133, Aug. 1988.

Margaret L. Simmons and Harvey J. Wasserman; Proceedings of the 1988 ACM/IEEE conference on Supercomputing, p. 288-295, Orlando, Florida, Nov. 12, 1988.

David A. Borman; ACM Computer Communication Review, vol. 19, No. 2, p. 11-15, Apr. 1989.

R. Braden, et al.; ACM Computer Communication Review, vol. 19, No. 2, p. 86-94, Apr. 1989.

David D. Clark, et al.; IEEE Communications Magazine, vol. 27, No. 6, pp. 23-29, Jun. 1989.

David R. Cheriton; ACM Computer Communication Review, vol. 19, No. 4, p. 158-169, Sep. 1989.

Derek Robert McAuley; PhD Thesis, University of Cambridge, Sep. 1989.

Craig Partridge; ACM Computer Communication Review, vol. 20, No. 1, p. 44-53, Jan. 1990.

D. D. Clark and D. L. Tennenhouse; ACM Computer Communication Review, vol. 20, No. 4, pp. 200-208, Sep. 1990.

Eric C. Cooper, et al.; ACM Computer Communication Review, vol. 20, No. 4, p. 135-144, Sep. 1990.

Bruce S. Davie; ACM Computer Communication Review, vol. 21, No. 4, Sep. 1991.

C. Brendan S. Traw, et al.; ACM Computer Communication Review, vol. 21, No. 4, p. 317-325, Sep. 1991.

Ian Leslie and Derek R. McAuley; ACM Computer Communication Review, vol. 21, No. 4, p. 327, Sep. 1991.

Mark Hayter, Derek McAuley; ACM Operating Systems Review, vol. 25, Issue 4, p. 14-21, Oct. 1991.

Gregory G. Finn; ACM Computer Communication Review, vol. 21, No. 5, p. 18-29, Oct. 1991.

Greg Chesson; Proceedings of the Third International Conference on High Speed Networking, Nov. 1991.

Michael J. Dixon; University of Cambridge Computer Laboratory Technical Report No. 245, Jan. 1992.

Danny Cohen, Gregory Finn, Robert Felderman, Annette DeSchon; Made available by authors, Jan. 10, 1992.

Gene Tsudik; ACM Computer Communication Review, vol. 22, No. 5, pp. 29-38, Oct. 1992.

Peter Steenkiste; ACM Computer Communication Review, vol. 22, No. 4, Oct. 1992.

Paul E. McKenney and Ken F. Dove; ACM Computer Communication Review, vol. 22, No. 4, Oct. 1992.

Erich Ruetsche and Matthias Kaiserswerth; Proceedings of the IFIP TC6/WG6.4 Fourth International Conference on High Performance Networking IV, Dec. 14, 1992.

C. Traw and J. Smith; IEEE Journal on Selected Areas in Communications, pp. 240-253, Feb. 1993.

E. Ruetsche; ACM Computer Communication Review, vol. 23, No. 3, Jul. 1993.

Jonathan M. Smith and C. Brendan S. Traw; IEEE Network, vol. 7, Issue 4, pp. 44-52, Jul. 1993.

Jeffrey R. Michel; MSci Thesis, University of Virginia, Aug. 1993.

Mark David Hayter; PhD Thesis, University of Cambridge, Sep. 1993.

Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, Vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, Oct. 1997.
Ed Anderson, et al.; Proceedings of the 1997 ACM/IEEE conference on Supercomputing, p. 1-17, San Jose, California, Nov. 16, 1997.

Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, 2001, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, 2002, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.

Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.

Patrick Geoffray; HPCWire article: http://www.hpcwire.com/features/17886984.html, Aug. 18, 2006.
Geoffray P., "Protocol off-loading vs on-loading in high-performance networks, " 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Extended EP Search Report mailed Dec. 6, 2010 in EP 10 176 955, related to LVL5 Mar. 2008.
Kieran, M., "Engineering a User-Level TCP for the CLAN Network," Proc. ACM SIGCOMMM 2003 Workshops, Aug. 29, 2003, New York (entire document).

* cited by examiner

USER-LEVEL STACK

CROSS-REFERENCE TO RELATED APPLICATIONS

This application claims priority under 35 U.S.C. 119 to UK Application No. GB0408876.1, filed Apr. 21, 2004, the disclosure of which is hereby incorporated by reference thereto in its entirety.

BACKGROUND OF THE INVENTION

This invention relates to a network interface, for example an interface device for linking a computer to a network.

FIG. 1 is a schematic diagram showing a network interface device such as a network interface card (NIC) and the general architecture of the system in which it may be used. The network interface device 10 is connected via a data link 5 to a processing device such as computer 1, and via a data link 14 to a data network 20. Further network interface devices such as processing device 30 are also connected to the network, providing interfaces between the network and further processing devices such as processing device 40.

The computer 1 may, for example, be a personal computer, a server or a dedicated processing device such as a data logger or controller. In this example it comprises a processor 2, a program store 4 and a memory 3. The program store stores instructions defining an operating system and applications that can run on that operating system. The operating system provides means such as drivers and interface libraries by means of which applications can access peripheral hardware devices connected to the computer.

It is desirable for the network interface device to be capable of supporting standard transport protocols such as TCP, RDMA and ISCSI at user level: i.e. in such a way that they can be made accessible to an application program running on computer 1. Such support enables data transfers which require use of standard protocols to be made without requiring data to traverse the kernel stack. In the network interface device of this example standard transport protocols are implemented within transport libraries accessible to the operating system of the computer 1.

A typical computer system 1 includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral devices must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

FIG. 2 illustrates one implementation of this. In this architecture the TCP (and other) protocols are implemented twice: as denoted TCP1 and TCP2 in FIG. 2. In a typical operating system TCP2 will be the standard implementation of the TCP protocol that is built into the operating system of the computer. In order to control and/or communicate with the network interface device an application running on the computer may issue API (application programming interface) calls. Some API calls may be handled by the transport libraries that have been provided to support the network interface device. API calls which cannot be serviced by the transport libraries that are available directly to the application can typically be passed on through the interface between the application and the operating system to be handled by the libraries that are available to the operating system. For implementation with many operating systems it is convenient for the transport libraries to use existing Ethernet/IP based control-plane structures: e.g. SNMP and ARP protocols via the OS interface.

There are a number of difficulties in implementing transport protocols at user level. Most implementations to date have been based on porting pre-existing kernel code bases to user level. Examples of these are Arsenic and Jet-stream. These have demonstrated the potential of user-level transports, but have not addressed a number of the problems required to achieve a complete, robust, high-performance commercially viable implementation.

FIG. 3 shows an architecture employing a standard kernel TCP transport (TCPk).

The operation of this architecture is as follows.

On packet reception from the network interface hardware (e.g. a network interface card (NIC)), the NIC transfers data into pre-allocated data buffer (a) and invokes the OS interrupt handler by means of the interrupt line. (Step i). The interrupt handler manages the hardware interface e.g. posts new receive buffers and passes the received (in this case Ethernet) packet looking for protocol information. If a packet is identified as destined for a valid protocol e.g. TCP/IP it is passed (not copied) to the appropriate receive protocol processing block. (Step ii).

TCP receive-side processing takes place and the destination part is identified from the packet. If the packet contains valid data for the port then the packet is engaged on the port's data queue (step iii) and that port marked (which may involve the scheduler and the awakening of blocked process) as holding valid data.

The TCP receive processing may require other packets to be transmitted (step iv), for example in the cases that previously transmitted data should be retransmitted or that previously enqueued data (perhaps because the TCP window has opened) can now be transmitted. In this case packets are enqueued with the OS "NDIS" driver for transmission.

In order for an application to retrieve a data buffer it must invoke the OS API (step v), for example by means of a call such as recv( ), select( ) or poll( ). This has the effect of informing the application that data has been received and (in the case of a recv( ) call) copying the data from the kernel buffer to the application's buffer. The copy enables the kernel (OS) to reuse its network buffers, which have special attributes such as being DMA accessible and means that the application does not necessarily have to handle data in units provided by the network, or that the application needs to know a priori the final destination of the data, or that the application must pre-allocate buffers which can then be used for data reception.

It should be noted that on the receive side there are at least two distinct threads of control which interact asynchronously: the up-call from the interrupt and the system call from the application. Many operating systems will also split the up-call to avoid executing too much code at interrupt priority, for example by means of "soft interrupt" or "deferred procedure call" techniques.

The send process behaves similarly except that there is usually one path of execution. The application calls the operating system API (e.g. using a send( )call) with data to be transmitted (Step vi). This call copies data into a kernel data buffer and invokes TCP send processing. Here protocol is applied and fully formed TCP/IP packets are enqueued with the interface driver for transmission.

If successful, the system call returns with an indication of the data scheduled (by the hardware) for transmission. However there are a number of circumstances where data does not become enqueued by the network interface device. For example the transport protocol may queue pending acknowledgements or window updates, and the device driver may queue in software pending data transmission requests to the hardware.

A third flow of control through the system is generated by actions which must be performed on the passing of time. One example is the triggering of retransmission algorithms. Generally the operating system provides all OS modules with time and scheduling services (driven by the hardware clock interrupt), which enable the TCP stack to implement timers on a per-connection basis.

If a standard kernel stack were implemented at user-level then the structure might be generally as shown in FIG. 4. The application is linked with the transport library, rather than directly with the OS interface. The structure is very similar to the kernel stack implementation with services such as timer support provided by user level packages, and the device driver interface replaced with user-level virtual interface module. However in order to provide the model of a asynchronous processing required by the TCP implementation there must be a number of active threads of execution within the transport library:

(i) System API calls provided by the application
(ii) Timer generated calls into protocol code
(iii) Management of the virtual network interface and resultant up calls into protocol code. (ii and iii can be combined for some architectures).

However, this arrangement introduces a number of problems:

(a) The overheads of context switching between these threads and implementing locking to protect shared-data structures can be significant, costing a significant amount of processing time.
(b) The user level timer code generally operates by using timer/time support provided by the operating system. Large overheads caused by system calls from the timer module result in the system failing to satisfy the aim of preventing interaction between the operating system and the data path.
(c) There may be a number of independent applications each of which manages a sub-set of the network connection; some via their own transport libraries and some by existing kernel stack transport libraries. The NIC must be able to efficiently parse packets and deliver them to the appropriate virtual interface (or the OS) based on protocol information such as IP port and host address bits.
(d) It is possible for an application to pass control of a particular network connection to another application, for example during a fork( ) system call on a Unix operating system. This requires that a completely different transport library instance would be required to access connection state. Worse, a number of applications may share a network connection which would mean transport libraries sharing ownership via (inter process communication) techniques. Existing transports at user level do not attempt to support this.
(e) It is common for transport protocols to mandate that a network connection outlives the application to which it is tethered. For example using the TCP protocol, the transport must endeavour to deliver sent, but unacknowledged data and gracefully close a connection when a sending application exits or crashes. This is not a problem with a kernel stack implementation that is able to provide the "timer" input to the protocol stack no matter what the state (or existence) of the application, but is an issue for a transport library which will disappear (possibly ungracefully) if the application exits, crashes, or stopped in a debugger.

It would be desirable to provide a system that at least partially addresses one or more of these problems a to e.

SUMMARY OF THE INVENTION

According to one aspect of the present invention, roughly described, there is provided a method for transmitting data by means of a data processing system, the system being capable of supporting an operating system and at least one application and having access to a memory and a network interface device capable of supporting a communication link over a network with another network interface device, the method comprising the steps of: forming by means of the application data to be transmitted; requesting by means of the application a non-operating-system functionality of the data processing system to send the data to be transmitted; responsive to that request: writing the data to be transmitted to an area of the memory; and initiating by means of direct communication between the non-operating-system functionality and the network interface device a transmission operation of at least some of the data over the network; and subsequently accessing the memory by means of the operating system and performing at least part of a transmission operation of at least some of the data over the network by means of the network interface device.

Preferably the operating system is capable of direct communication with the network interface device.

The said direct communication between the non-operating-system functionality preferably bypasses the operating system.

The non-operating-system functionality is preferably implemented by software, most preferably by software running on the data processing system. It may conveniently be a transport library. The non-operating-system functionality most preferably does not require an increase in privilege level in order to accomplish the steps it performs.

The said area of the memory may be mapped to a second area of the memory. The second area of the memory may be accessible to the operating system, most preferably directly accessible, but not directly accessible to the non-operating-system functionality.

The method may comprise, on initiating a transmission operation of data over the network, starting a timer; and if the timer reaches a predetermined value before an acknowledgement is received for that data transmitting a failure message from the network interface device to the data processing system.

The method may comprise, on initiating a transmission operation of data over the network, storing a record of that operation and an indication of the application that was the source of the data; and, on receiving data for that application starting a timer for each record associated with that application; and if such a timer reaches a predetermined value before an acknowledgement is received for that data transmitting a failure message from the network interface device to the data processing system.

Preferably the or each timer is run on the network interface device.

The method may comprise cancelling the timer on receiving an acknowledgement for the data, and wherein the or each failure message is directed to the operating system.

The step of cancelling the timer may comprise the application signalling the entity on which the timer is run in a manner that bypasses the operating system.

The or each failure message is preferably directed to the application that was the source of the data.

The operating system is preferably responsive to failure messages that are directed to applications that are no longer in communication with the network device to perform the said at least part of a transmission operation in respect of data corresponding to the failure message.

According to a second aspect of the present invention, roughly described, there is provided a method for receiving data by means of a data processing system, the system being capable of supporting at least one application and having access to a memory and a network interface device capable of supporting a communication link over a network with another network interface device, the method comprising the steps of: establishing by means of a non-operating-system functionality of the data processing system a channel for reception of data by an application, the channel being associated with an area of the memory; receiving data through that channel by: the network interface device writing received data to the area of the memory; and the application reading received data from that area; and subsequently if the application is unable to communicate with the network device the operating system reading received data from that area.

Preferably the operating system is arranged to automatically read received data from that area on a determination being made that the application is unable to communicate with the network device.

According to a third aspect of the present invention, roughly described, there is provided a method for transmitting data by means of a data processing system, the system being capable of supporting at least one application and having access to a memory and a network interface device capable of supporting a communication link over a network with another network interface device, the method comprising the steps of: forming by means of the application data to be transmitted; passing that data to the network interface device for transmission; transmitting the data by means of the network interface device and, optionally on that transmission, establishing a timer corresponding to the data; and if an acknowledgement is received over the network for the data, cancelling the timer; or if the timer reaches a predetermined value, signalling the operating system by means of the network interface device to indicate that no acknowledgement has been received for the data.

The timer may be started upon establishment of the timer.

When the timer has been established, it may be started upon receipt of data directed to the application that was the source of the data upon whose transmission the timer was established.

The said passing of the data may be performed by a non-operating-system functionality of the data processing system.

The non-operating-system functionality may be a transport library.

The said passing of the data may be performed bypassing the operating system.

The said signalling may comprise applying a failure event to an event queue of the operating system.

According to a fourth aspect of the present invention, roughly described, there is provided a method for transmitting or receiving data by means of a data processing system, the system supporting an operating system and at least one application and having access to a memory and a network interface device capable of supporting a communication link over a network with another network interface device, the method comprising: allocating one or more areas of the memory for use as buffers in the transfer of data between the data processing system and the network interface device; and directly accessing at least one of the areas of the memory by means of the application for at least one of transmission and reception of data by means of the network interface device; and directly accessing the said at least one of the areas of the memory by means of the operating system for at least one of transmission and reception of data by means of the network interface device.

Preferably the method comprises: receiving data from the network by means of the network device; and writing that data to the said at least one of the areas by means of the network device.

Preferably the network device is configured to signal the operating system to access the said at least one of the areas if the application is determined to be unresponsive, and the method comprises performing the said step of directly accessing the said at least one of the areas of the memory by means of the operating system in response to such a signal. The said signal may be an interrupt.

Preferably the network device supports a timer and the method comprises starting the timer to count from a preset initial value when received data is written to the said at least one of the areas, and the application is determined to be unresponsive if the timer reaches a preset final value. Preferably the final value is zero.

Preferably the method comprises the step of setting the initial value and/or the final value by means of the application. Most preferably the final value is zero and only the initial value is set by means of the application.

The method preferably comprises stopping the timer by means of the application on reading received data by means of the application from the said at least one of the areas.

Preferably each of the said steps of directly accessing at least one of the areas of the memory for at least one of transmission and reception of data by means of the network interface device comprises protocol processing of data received from the network by the network interface device and stored in the said at least one of the areas. The protocol processing may comprise one or more of: extracting traffic data from the received data, transmitting an acknowledgement and/or re-transmit message over the network in respect of at least some of the received data, checking sequence values of received data units in the received data, and calculating checksums in respect of the received data. The protocol may be TCP.

Preferably the method comprises: reading data from the said at least one of the areas by means of the network device; and transmitting that data over the network by means of the network device.

Preferably each of the said steps of directly accessing at least one of the areas of the memory for at least one of transmission and reception of data by means of the network interface device comprises storing data for transmission in the said at least one of the areas.

Preferably each of the said steps of directly accessing at least one of the areas of the memory for at least one of transmission and reception of data by means of the network interface device comprises triggering the network interface device to perform the said step of reading data from the said at least one of the areas.

Preferably the network device is configured to signal the operating system to access the said at least one of the areas if the application is determined to be unresponsive, and the method comprises performing the said step of directly accessing the said at least one of the areas of the memory by means of the operating system in responsive to such a signal.

According to a further aspect of the present invention there is provided a system for performing any of the methods described above.

BRIEF DESCRIPTION OF THE DRAWINGS

The present invention will now be described by way of example with reference to the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
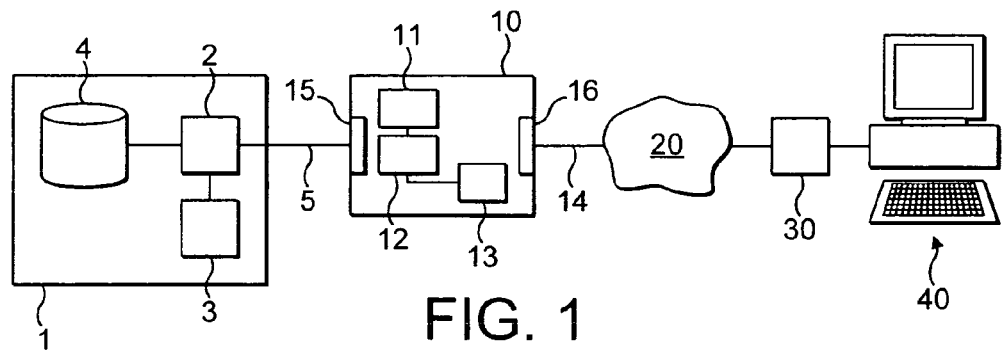
FIG. 1 is a schematic diagram of a network interface device in use.
Figure 2:
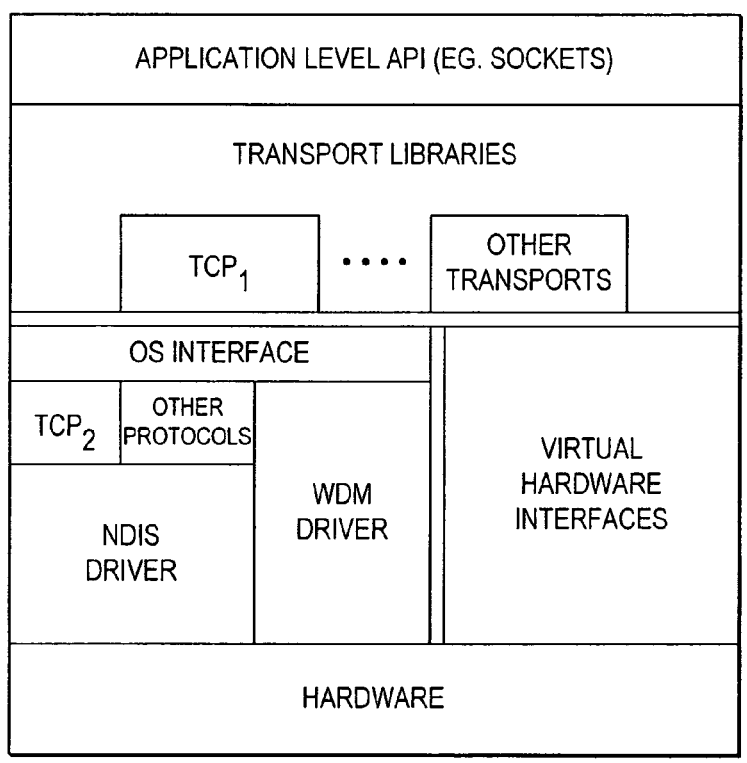
FIG. 2 illustrates an implementation of a transport library architecture.
Figure 3:
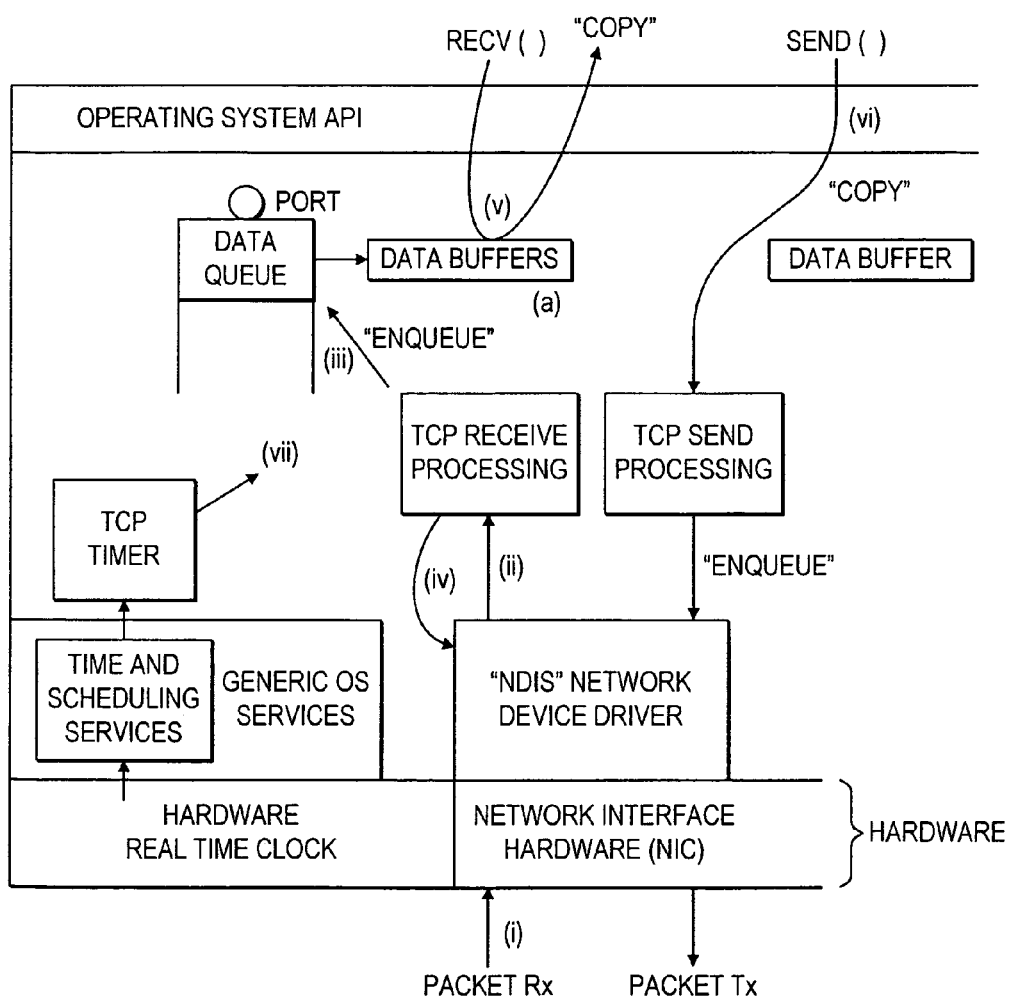
FIG. 3 shows an architecture employing a standard kernel TCP transport with a user level TCP transport.
Figure 4:
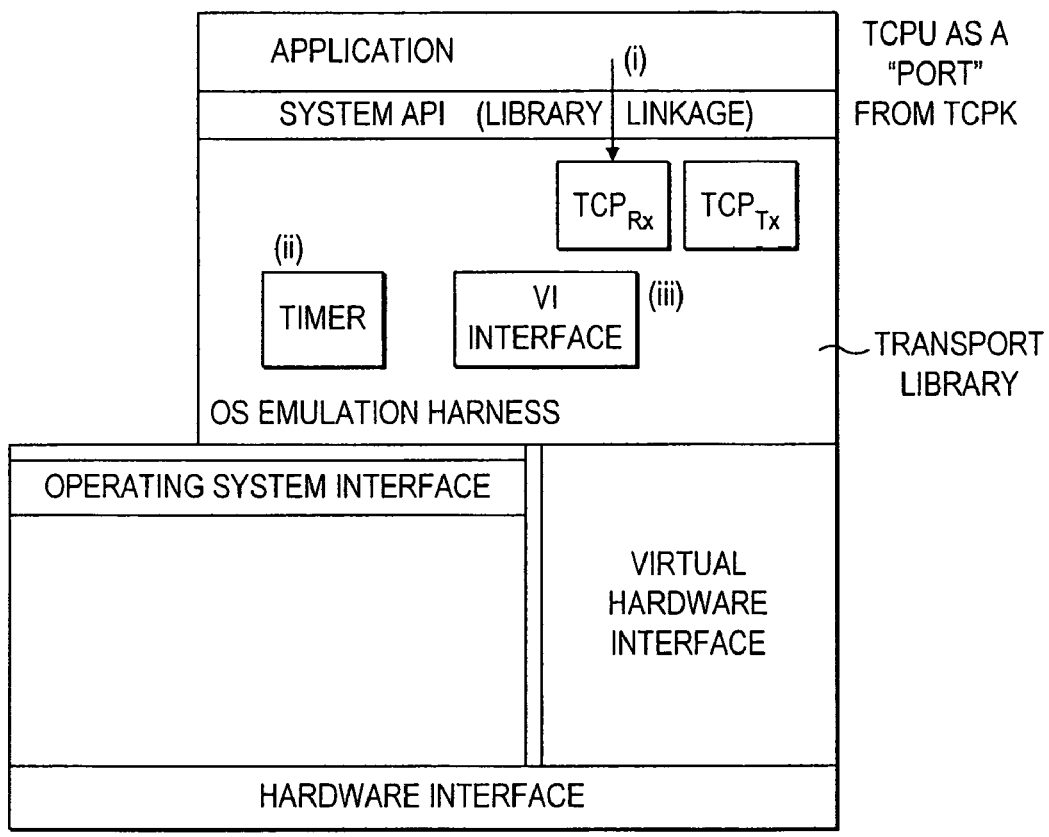
FIG. 4 illustrates an architecture in which a standard kernel stack is implemented at user-level.
Figure 5:
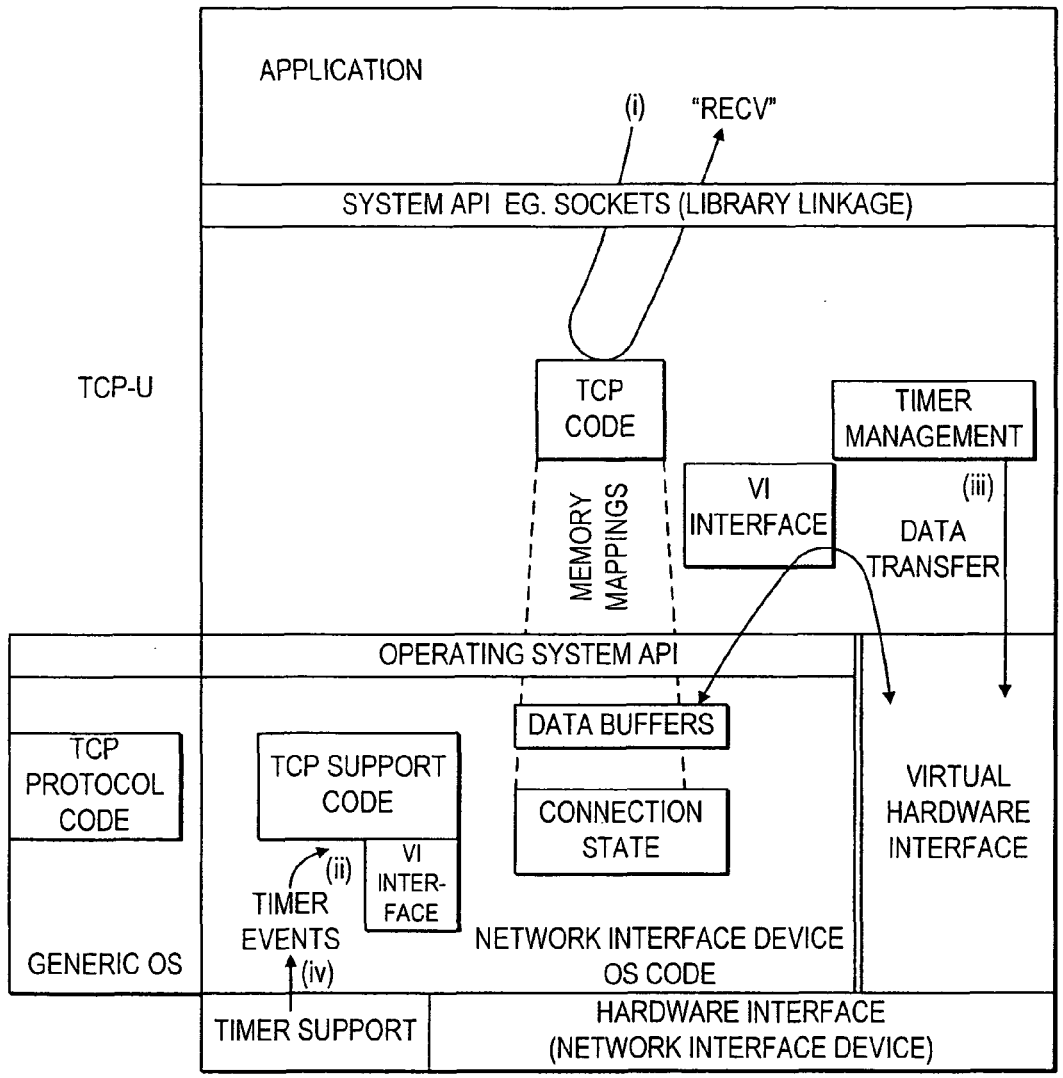
FIG. 5 shows an example of a TCP transport architecture.

FIG. 5 shows an example of a TCP transport architecture suitable for providing an interface between a network interface device such as device 10 of FIG. 1 and a computer such as computer 1 of FIG. 1. The architecture is not limited to this implementation.

The principal differences between the architecture of the example of FIG. 5 and conventional architectures are as follows.

(i) TCP code which performs protocol processing on behalf of a network connection is located both in the transport library, and in the OS kernel. The fact that this code performs protocol processing is especially significant.

(ii) Connection state and data buffers are held in kernel memory and memory mapped into the transport library's address space. The operating system is the owner of those buffers, thus having full control over them, but they can be directly accessed by the application for whose communications they are to be used. This enables the application to transmit and receive data directly through those buffers and to read state data from the corresponding state buffer.

(iii) Both kernel and transport library code may access the virtual hardware interface for and on behalf of a particular network connection (iv) Timers may be managed through the virtual hardware interface, (these correspond to real timers on the network interface device) without requiring system calls to set and clear them. The NIC generates timer events which are received by the network interface device driver and passed up to the TCP support code for the device.

It should be noted that the TCP support code for the network interface device is in addition to the generic OS TCP implementation. This is suitably able to co-exist with the stack of the network interface device.

In the architecture of FIG. 5, buffers are allocated in memory on the data processor for use in cooperation with the NIC for the transmission and/or reception of data over the network. In the case of a transmit buffer, which is for use in transmitting data, the NIC is configured for reading data from that buffer and transmitting it over the network. The NIC may automatically read that data and transmit it, or it may be triggered to read the data by an application or the operating system running on the data processor. The trigger can conveniently be an interrupt. In the case of a receive buffer, which is for use in receiving data, the NIC is configured for writing to that buffer data received over the network. The data in the receive buffer may then be read by the application or the operating system and further processed by it.

The buffers are most conveniently owned by the operating system, in the sense that it has control over which entities have access to the buffers, it has allocated and/or created the buffers, and it is responsible for deleting them. However, both the application and the operating system can directly access the buffers for reading data from and writing data to them. The circumstances in which these steps occur will be described below.

In the case of transmission of data, the application will be expected to write data to a buffer for transmission and then trigger the NIC to read from the buffer to transmit that data. In some situations this alone may be sufficient to allow the data to be transmitted successfully over the network. However, the NIC does not perform protocol processing of transmitted or received data. Instead it is performed by the application or the operating system. Therefore if, for instance, the data is not received successfully by the intended recipient the application or the operating system must process acknowledgements, retransmission requests etc. (according to the protocol in use) and cause the NIC to perform retransmission. Normally this can be expected to be done by the application. When the NIC has data such as an acknowledgement message or a timeout for the application it writes that either to a receive buffer and/or an event queue. At the same time it starts a timer running. When the application accesses the data it stops and resets the timer. In that way the NIC knows that the application is responsive. However, if the timer reaches a predetermined value then the NIC determines that the application is unresponsive and signals the operating system, for example by means of an interrupt, to handle the data for the application. This has a number of advantages. First, the transmission of the data can be progressed by the operating system even if the application is busy or has been descheduled. Second, it gives the application the opportunity to intentionally ignore the data, for example by having itself descheduled, once it has placed it on the transmit queue, since the operating system will take over if necessary. Preferably the application controls the length of the timer, for example by setting its initial value. This allows the application to set the timer to suit its priority. The timer is preferably a hardware resource on the NIC to which the application has direct access.

In the case of reception of data, the NIC will receive the data and write it to a receive buffer. When doing so it will set a timer as described above, and preferably inform the application via an event queue. When the application access the data it resets the timer as described above. This again gives the NIC the possibility of determining when the application is unresponsive. Other means such as periodic scans of the data in the buffer by the NIC could be used for the same purpose if the application is determined to be unresponsive then again the NIC signals the operating system to process the received data. In the case of received data the processing by either the application or the operating system will typically involve protocol processing (e.g. checking of packet sequence numbers, processing checksums, extracting traffic data and/or signalling the NIC to transmit an acknowledgement or retransmission request) and/or removal of data from the buffer for use, typically at user level.

Whilst the buffers are preferably allocated by the operating system, it is convenient for that to be done in response to a request from an application. Thus, if the received data might overflow the available receive buffers for an application, the application can request allocation of further buffers by the operating system. The NIC may signal the application by means of an event if this situation arises, based on pre-stored rules taking into account factors such as the amount of received buffer that remains free. Again it may set a timer when this signalling takes place, and if the application does not respond then the NIC can transmit a request to the operating system for a further receive buffer. The operating system can then allocate that buffer and inform the NIC of it, so that data can continue to be received for the application even if it is unresponsive.

The effects of this architecture are as follows.

(a) Requirement for Multiple Threads Active in the Transport Library

This requirement is not present for the architecture of FIG. 5 since TCP code can either be executed in the transport library as a result of a system API call (e.g. recv( )) (see step i of FIG. 5) or by the kernel as a result of a timer event (see step ii of FIG. 5). In ether case, the VI (virtual interface) can be managed and both code paths may access connection state or data buffers, whose protection and mutual exclusion may be managed by shared memory locks. As well as allowing the overheads of thread switching at the transport library level to be removed, this feature can prevent the requirement for applications to change their thread and signal-handling assumptions: for example in some situations it can be unacceptable to require a single threaded application to link with a multi-threaded library.

(b) Requirement to Issue System Calls for Timer Management

This requirement is not present for the architecture of FIG. 5 because the network interface device can implement a number of timers which may be allocated to particular virtual interface instances: for example there may be one timer per active TCP transport library. These timers can be made programmable (see step iii of FIG. 5) through a memory mapped VI and result in events (see step iv of FIG. 5) being issued. Because timers can be set and cleared without a system call—without directly involving the operating system—the overhead for timer management is greatly reduced.

(c) Correct Delivery of Packets to Multiple Transport Libraries

The network interface device can contain or have access to content addressable memory, which can match bits taken from the headers of incoming packets as a parallel hardware match operation. The results of the match can be taken to indicate the destination virtual interface which must be used for delivery, and the hardware can proceed to deliver the packet onto buffers which have been pushed on the VI. One possible arrangement for the matching process is described below. The arrangement described below could be extended to de-multiplex the larger host addresses associated with IPv6, although this would require a wider CAM or multiple CAM lookups per packet than the arrangement as described.

One alternative to using a CAM for this purpose is to use a hash algorithm that allows data from the packets' headers to be processed to determine the virtual interface to be used.

(d) Handover of Connections between Processes/Applications/Threads

When a network connection is handed over the same system-wide resource handle can be passed between the applications. This could, for example, be a file descriptor. The architecture of the network interface device can attach all state associated with the network connection with that (e.g.) file descriptor and require the transport library to memory map on to this state. Following a handover of a network connection, the new application (whether as an application, thread or process)—even if it is executing within a different address space—is able to memory-map and continue to use the state. Further, by means of the same backing primitive as used between the kernel and transport library any number of applications are able to share use of a network connection with the same semantics as specified by standard system APIs.

(e) Completion of transport protocol operations when the transport library is ether stopped or killed or quit.

This step can be achieved in the architecture of the network interface device because connection state and protocol code can remain kernel resident. The OS kernel code can be informed of the change of state of an application in the same manner as the generic TCP (TCPk) protocol stack. An application which is stopped will then not provide a thread to advance protocol execution, but the protocol will continue via timer events, for example as is known for prior art kernel stack protocols.

There are a number newly emerging protocols such as IETF RDMA and iSCSI. At least some of these protocols were designed to run in an environment where the TCP and other protocol code executes on the network interface device. Facilities will now be described whereby such protocols can execute on the host CPU (i.e. using the processing means of the computer to which a network interface card is connected). Such an implementation is advantageous because it allows a user to take advantage of the price/performance lead of main CPU technology as against co-processors.

Protocols such as RDMA involve the embedding of framing information and cyclic redundancy check (CRC) data within the TCP stream. While framing information is trivial to calculate within protocol libraries, CRC's (in contrast to checksums) are computationally intensive and best done by hardware. To accommodate this, when a TCP stream is carrying an RDMA or similar encapsulation an option in the virtual interface can be is enabled, for example by means of a flag. On detecting this option, the NIC will parse each packet on transmission, recover the RDMA frame, apply the RDMA CRC algorithm and insert the CCRC on the fly during transmission. Analogous procedures can beneficially be used in relation to other protocols, such as iSCSI, that require computationally relatively intensive calculation of error check data.

In line with this system the network interface device can also verify CRCs on received packets using similar logic. This may, for example, be performed in a manner akin to the standard TCP checksum off-load technique.

Protocols such as RDMA also mandate additional operations such as RDMA READ which in conventional implementations require additional intelligence on the network interface device. This type of implementation has led to the general belief that RDMA/TCP should best be implemented by means of a co-processor network interface device. In an architecture of the type described herein, specific hardware filters can be encoded to trap such upper level protocol requests for a particular network connection. In such a circumstance, the NIC can generate an event akin to the timer event in order to request action by software running on the attached computer, as well a delivery data message. By triggering an event in such a way the NIC can achieve the result that either the transport library, or the kernel helper will act on the request immediately. This can avoid the potential problem of kernel extensions not executing until the transport library is scheduled and can be applied to other upper protocols if required.

One advantage that has been promoted for co-processor TCP implementations is the ability to perform zero-copy operations on transmit and receive. In practice, provided there is no context switch or other cache or TLB (transmit look-aside buffer) flushing operations on the receive path (as for the architecture described above) there is almost no overhead for a single-copy on receive since this serves the purpose of loading the processor with received data. When the application subsequently accesses the data it is not impacted by cache misses, which would otherwise be the case for a zero copy interface.

However on transmit, a single copy made by the transport library does invoke additional overhead both in processor cycles and in cache pollution. The architecture described above can allow copy on send operations to be avoided if the following mechanisms are, for example, implemented:

(i) transmitted data can be acknowledged quickly (e.g. in a low-latency environment); alternatively
(ii) where data is almost completely acknowledged before all the data in a transfer is sent (e.g. if bandwidth x delay product is smaller than the message size).

The transport library can simply retain sent buffers until the data from them is acknowledged, and data transmitted without copying. This can also be done when asynchronous networking APIs are used by applications.

Even where data copy is unavoidable, the transport library can use memory copy routines which execute non-temporal stores. These can leave copied data in memory (rather than cache), thus avoiding cache pollution. The data not being in cache would not be expected to affect performance since the next step for transmission will be expected to be DMA of the data by the network interface device, and the performance of this DMA operation is unlikely to be affected by the data being in memory rather than cache.

Figure 6:
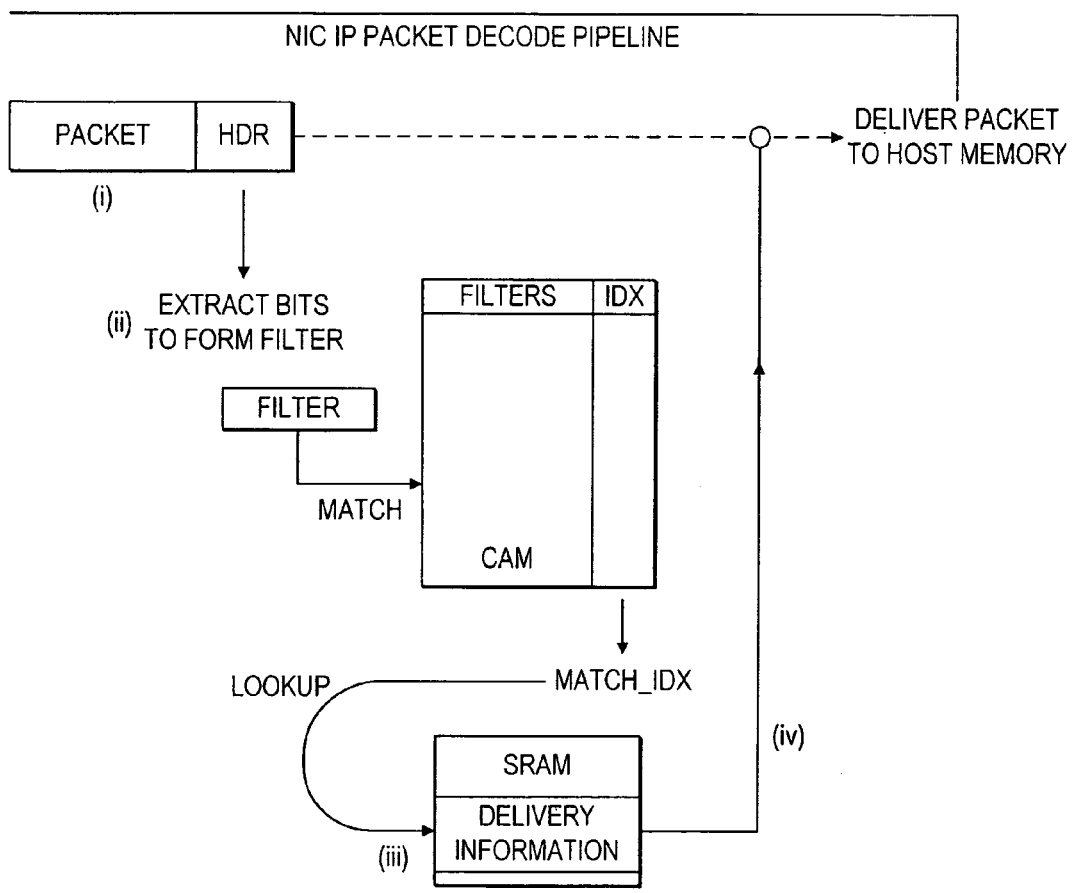
FIG. 6 shows the steps that can be taken by the network interface device to filter an incoming TCP/packet.

FIG. 6 shows the steps that can be taken by the network interface device described above to filter an incoming TCP packet. At step I the packet is received by the network interface device from the network and enters the receive decode pipeline. At step ii the hardware extracts relevant bits from the packet and forms a filter (which in this example is 32 bits long) which is presented to the CAM. The configuration and number of relevant bits depends on the protocol that is in use; this example relates to TCP/IP and UDP/IP. At step iii, when a CAM match is made it results in an index: MATCH_IDX being returned, which can be used to look up delivery information (e.g. the memory address of the next receive buffer for this connection). At step iv this delivery information is fed back to the packet decode pipeline and enables the packet to be delivered to the appropriate memory location.

The selection of the bits and their use to form the filter will now be described.

The network interface device can (preferably in hardware) interrupt or buffer the flow of incoming packets in order that it can in effect pause the network header. This allows it to identify relevant bit sequences in incoming packets without affecting the flow of data. For TCP and/or UDP packets the identification of bit sequences may, for example, be implemented using a simple decode pipeline because of the simple header layout of such packets. This results in a number of fields held in registers.

It is assumed that zero is neither a valid port number nor a valid IP address, and that interfaces in separate processes do not share a local IP address and port pair (except where a socket is shared after a fork( ) command or the equivalent). The latter condition means it is safe to disregard the local IP address when demultiplexing received TCP packets.

For a listening TCP socket only the local IP and port number need be considered, whereas for an established TCP socket remote IP and both port numbers should be considered. The processing performed by the network interface device should therefore (conveniently in hardware) determine whether a received packet is a TCP or a UDP packet, and for TCP packets must inspect the SYN and ACK bits. It can then form a token accordingly, which is looked up in the CAM. The operation of the CAM is illustrated in the following table:

TABLE 1

|  | Bits 0-31 | Bits 32-47 | Bits 48-63 |
| --- | --- | --- | --- |
| TCP SYN = 1 & ACK = 0 | Local (dest) IP | 0 | Dest port |
| TCP otherwise | Remote (src) IP | Src port | Dest port |
| UDP | Local (dest) IP | Dest port | 0 |

In this table, the first column indicates the type of received packet, and the remaining columns indicate the content of the first 32 bits of the token, the next 16 bits and the final 16 bits respectively. The order of the bits is immaterial provided the same convention is used consistently.

The following table gives examples:

TABLE 2

| Packet type | Bits 0-31 | Bits 32-47 | Bits 48-63 |
| --- | --- | --- | --- |
| 1. TCP listen | 192.168.123.135 | 0 | 80 |
| 2. TCP established | 66.35.250.150 | 33028 | 80 |
| 3. TCP established | 66.35.250.150 | 23 | 28407 |
| 4. UDP | 192.168.123.135 | 123 | 0 |

In the examples number 1 illustrates the situation for a local web serve listening on 192.168.123.135:80; number 2 illustrates the situation for a connection accepted by that server from 66.35.250.150:33028; number 3 illustrates a telnet connection to 66.35.250.150, initiated locally; and number 4 illustrates the situation for an application receiving UDP packets on port 123.

By separating out the situation where TCP SYN=1 & ACK=0, as in the first row of table 1, it can be ensured that such entries match TCP connection request messages (destined for sockets in the LISTEN state), but do not match connection replies (which are destined for sockets in the SYN_SENT state).

Other combinations of zero fields could be used to demultiplex on other fields. For example, demultiplexing could be performed on the ETHER_TYPE field of the Ethernet header.

The logic that determines the configuration of the CAM filter depends on the protocol(s) that is/are to be used. In a practical implementation the CAM could be configured through a virtual interface by means of transport library code, allowing it to be set up dynamically for a particular implementation.

Under the UDP protocol, each network end point specified in a UDP packet can be uniquely identified by the filter as illustrated in table 1.

Under the TCP protocol the unique identity of an endpoint would normally require all host and port fields in order for it to be unambiguously specified. This requirement arises because the TCP protocol definition allows: multiple clients to connect to network endpoints with the same destination host and port addresses, a connection to be initiated from either the client or the server, or a server network endpoint to accept connection requests on a single endpoint and to spawn new network endpoints to handle the data transfer.

The header in such packets is typically 96 bits long. However, constructing a 96-bit filter is inefficient for most commercially available CAMs since they are typically available with widths of 64 or 128 (rather than 96) bits. The following mechanism enables 64 bit filters to be constructed more efficiently. The length of the CAM may be chosen to suit the application. A convenient size may be 16 kb.

(1) If a server (PASSIVE) socket is listening for new connections then all valid incoming TCP packets will have their SYN bit set in their headers in order to indicate a need to synchronise sequence numbers. Packets of that type are identified by the NIC and used to form a filter as illustrated in table 1. Note that the bit layout of the filter means that this filter cannot clash with a UDP endpoint with the same host:port pair because of the zero field placement. Thus the layout of the CAM filter is used to indicate the protocol decode case.

(2) Once a connection is established, valid incoming packets will have their SYN bit set to zero and may be correctly filtered by the logic illustrated in table 1.

Figure 7:
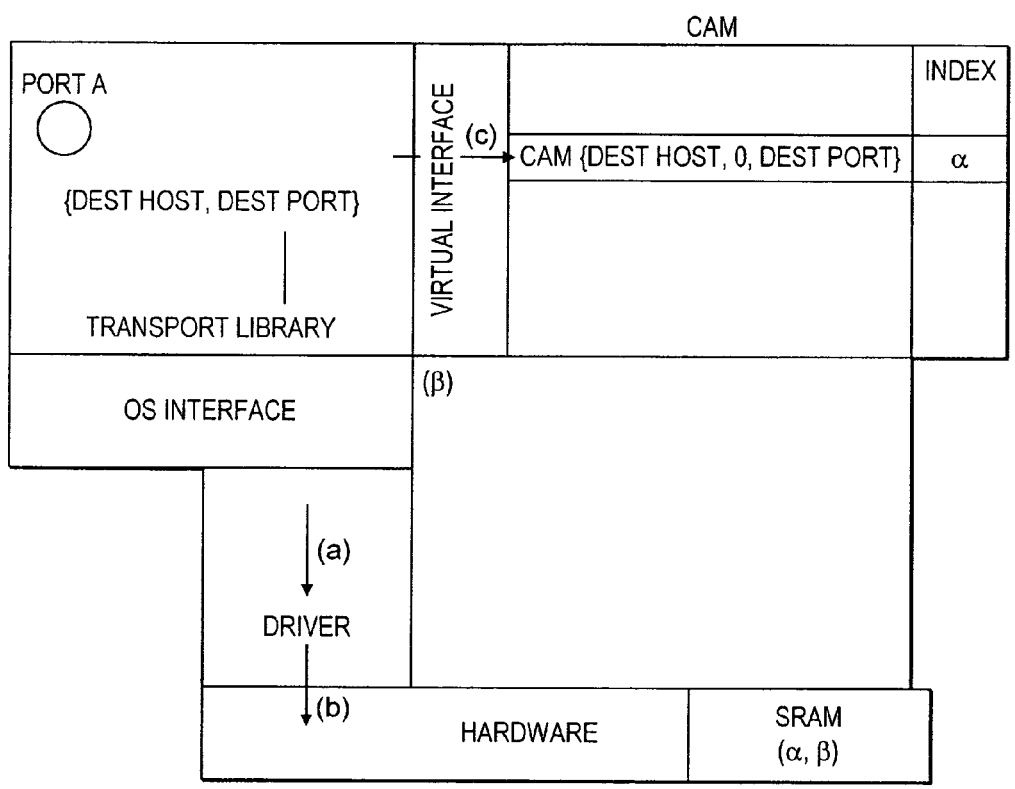
FIG. 7 illustrates to operation of a server (passive) connection by means of a content addressable memory.

Note that in this case the identity of the DEST (destination) host is no longer required in order to identify the correct destination transport library, although the library will in the normal course of reception check this field as part of its normal packet validation procedure. This procedure is illustrated with respect to the server (passive) connection, the contents of the CAM (programmed by the server transport library) and the filters presented to the CAM by the NIC on each packet, as illustrated in FIG. 7. This involves the following steps:

(a) The transport library allocates a CAM entry via the driver.
(b) The driver programs the hardware through its protected control interface to map the allocated CAM into the address space allocated to the transport library's virtual interface.
(c) The transport library programs the CAM entry via its virtual interface. Where an application is deemed to have insufficient access rights to receive a programmable CAM entry, it can instead be permitted to do so via OS calls.
(ii) A TCP/IP connect packet arrives. Because the SYN bit in the packet header is set to one and the ACK bit in the packet header is set to zero, the network interface device can construct the filter:
{dest host, 0, dest port}
from the bits in the packet header and presents it to the CAM. This causes a match to occur with CAM index A. The network interface device can then look up and in the SRAM to find the base address of the virtual interface: β. The NIC can then deliver the packet to virtual interface β.

As a result of the connect packet, the server application may create another network endpoint to handle the network connection. This endpoint may be within its own or another application context and so may be managed by another transport library. In either case, a network connection can be created which joins:
{dest host, port}
to
{source host, port}
the server programs a new CAM entry with:
{source host, source port, dest port}
(iii) When a packet arrives for the new network connection, it will have its SYN bit set to zero. This causes the NIC to construct a filter:
{source, host source port, dest port}
which when presented to the CAM causes a match index θ to be produced which matches virtual interface a in the SRAM. It should be noted that σ may be the same as β if the network connection is managed by the same transport library as the server endpoint.

This encoding can similarly be employed for active (client) connections initiated by the host and for all models of communication specified in the TCP and UDP protocol specifications.

One notable benefit of the encoding scheme is that it enables the hardware to determine the address of the virtual interface using only one CAM lookup.

The network interface device preferably also supports a mode of operation in which it simply de-multiplexes packets onto transport libraries, rather than on to network endpoints. This may be beneficial where the device is handling communications between a network and a server which is required to service large numbers (e.g. millions) of connections with the network simultaneously. Examples of this may be high-capacity web server nodes. Two options are available. One option is to store only filters of the form:
{dest host, dest port}
in the CAM. Another option is to employ a ternary CAM which can mask using "don't care" bits. It should be noted that if both modes of operation were to be enabled simultaneously then efficiency may be reduced because two CAM lookups might be required due to the necessity to construct different filters when the SYN bit is set to zero in a received packet. This requirement would be avoided if only one mode were enabled at a time.

The "network interface card" could be embodied as a physical card or it could be implemented in another way, for example as an integrated circuit that is incorporated on to the motherboard of a data processing device.

In this way TCP/IP and UDP/IP packets can both be matched using 64 bits of CAM: as opposed to the 128 bits that would be required if a standard sized CAM using bit-by-bit matching over the whole header were to be used.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for transmitting data by means of a data processing system having a processor subsystem, the system being capable of supporting an operating system and at least one application and having access to a memory and a network interface device capable of supporting a communication link over a network with another network interface device, the method comprising the steps of:

forming by means of an application executing on the processor subsystem, data to be transmitted;

requesting by means of the application a non-operating-system functionality executing on the processor subsystem to send the data to be transmitted over the network;

responsive to that request:

writing the data to be transmitted to an area of the memory comprising a data buffer and corresponding connection state; and initiating by means of direct communication between the non-operating-system functionality and the network interface device a transmission operation of at least some of the data over the network;

and after the transmission operation has been initiated over the network, determining that the application is unresponsive, and in response to such determination, the operating system accessing the said data buffer and connection state and continuing the transmission operation over the network by means of the network interface device, wherein the processor subsystem is in communication with the memory via a bus, and wherein the network interface device is in communication with the memory via a bus.

2. A method as claimed in claim 1, wherein the operating system is capable of direct communication with the network interface device.

3. A method as claimed in claim 2, wherein the said direct communication between the non-operating-system functionality bypasses the operating system.

4. A method as claimed in any of claims 1-3, wherein the non-operating-system functionality is a transport library.

5. A method as claimed in any of claims 1-3, wherein the said area of the memory is mapped to a second area of the memory, and the second area of the memory is accessible to the operating system but not directly accessible to the non-operating-system functionality.

6. A method as claimed in any of claims 1-3, comprising, on initiating a transmission operation of data over the network, starting a timer; and if the timer reaches a predetermined value before an acknowledgement is received for that data transmitting a failure message from the network interface device to the data processing system.

7. A method as claimed in any of claims 1 to 3, comprising, on initiating a transmission operation of data over the network, storing a record of that operation and an indication of the application that was the source of the data; and, on receiving data for that application starting a timer for each record associated with that application; and if such a timer reaches a predetermined value before an acknowledgement is received for that data transmitting a failure message from the network interface device to the data processing system.

8. A method as claimed in claim 6, wherein the or each timer is run on the network interface device.

9. A method as claimed in claim 7, comprising cancelling the timer on receiving an acknowledgement for the data, and wherein the or each failure message is directed to the operating system.

10. A method as claimed in claim 9, wherein the step of cancelling the timer comprises the application signaling the entity on which the timer is run in a manner that bypasses the operating system.

11. A method as claimed in claim 6, wherein the or each failure message is directed to the application that was the source of the data.

12. A method as claimed in claim 11, wherein the operating system is responsive to failure messages that are directed to applications that are no longer in communication with the network device to continue the transmission operation in respect of data corresponding to the failure message.

13. A data processing system for transmitting data, comprising:

a processor subsystem having access to a memory and a network interface device capable of supporting a communication link over a network with another network interface device, the processor subsystem being in communication with the memory via a bus and the network interface device being in communication with the memory via a bus, the data processing system having:

an application configured to, while executing on the processor subsystem, form data to be transmitted, cause it to be written to an area of the memory comprising a data buffer and corresponding connection state and request a non-operating-system functionality of the data processing system to send the data to be transmitted over the network;

a non-operating system functionality configured to, while executing on the processor subsystem, initiate by means of direct communication between itself and the network interface device a transmission operation of at least some of the data over the network; and an operating system configured to, while executing on the processor subsystem and in response to the application being determined to be unresponsive after the transmission operation has been initiated over the network, access the said data buffer and connection state and continue the transmission operation over the network by means of the network interface device.

14. A method for receiving data by means of a data processing system having a processor subsystem, the system being capable of supporting at least one application and having access to a memory and a network interface device capable of supporting a communication link over a network with another network interface device, the method comprising the steps of:

establishing by means of a non-operating-system functionality executing on the processor subsystem, a channel for reception of data by an application, the channel being associated with an area of the memory comprising a data buffer and corresponding connection state; and receiving data of a data reception operation through that channel by:

the network interface device writing received data to the data buffer; and the application, while executing on the processor subsystem, reading received data from the data buffer; and after the reception operation has been initiated over the network, and in response to the application becoming unable to communicate with the network device the operating system, while executing on the processor subsystem, accessing the connection state and the data buffer and continuing the data reception operation, wherein the processor subsystem is in communication with the memory via a bus, and wherein the network interface device is in communication with the memory via a bus.

15. A method as claimed in claim 14, wherein the operating system is arranged to automatically read received data from the data buffer on a determination being made that the application is unable to communicate with the network device.

16. A system for receiving data comprising:

a network interface device capable of supporting a communication link over a network with another network interface device;

a data processing system having a processor subsystem and supporting an operating system and at least one application and having access to a memory and the network interface device, the data processing system further supporting a non-operating-system functionality configured for, while executing on the processor subsystem, establishing a channel for reception of data by an application, the channel being associated with an area of the memory comprising a data buffer and corresponding connection state;

the network interface device being configured to write received data of a data reception operation to the data buffer;

the application being configured to read received data from the data buffer while the application is executing on the processor subsystem; and the operating system being configured to, while executing on the processor subsystem and in response to the application becoming unable to communicate with the network device after the reception operation has been initiated over the network, access the connection state and the data buffer and continue the data reception operation, the processor subsystem being in communication with the memory via a bus and the network interface device being in communication with the memory via a bus.

17. A method for transmitting data by means of a data processing system having a processing subsystem, the system being capable of supporting an application and an operating system and having access to a memory and a network interface device capable of supporting a communication link over a network with another network interface device, the method comprising the steps of:

forming by means of the application data to be transmitted;

a non-operating-system functionality, while executing on the processor subsystem, passing that data to the network interface device for transmission, the said passing of the data being performed bypassing the operating system;

transmitting the data by means of the network interface device;

on receiving an acknowledgement for the data, the network interface device writing the acknowledgement to an area of the memory accessible to the application and starting a timer at the network interface device; and if the application accesses the acknowledgement, cancelling the timer; or if the timer reaches a predetermined value, the network interface device signaling the operating system to indicate that the application is unresponsive, the processor subsystem being in communication with the memory via a bus and the network interface device being in communication with the memory via a bus.

18. A method as claimed in claim 17, wherein the non-operating-system functionality is a transport library.

19. A method as claimed in claim 17, wherein the said signaling comprises applying a failure event to an event queue of the operating system.

20. A method as claimed in claim 17, comprising: in response to the operating system being signaled, the operating system communicating with the network interface device to advance communication with the said another network device.

21. A system for transmitting data comprising a data processing system supporting an operating system and a network interface device capable of supporting a communication link over a network with another network interface device, the data processing system having a processor subsystem with access to a memory and the network interface device, and further having:

an application configured to form data to be transmitted;

a non-operating-system functionality configured to, while executing on the processor subsystem, pass the formed data to the network interface device for transmission, the said passing of the data being performed bypassing the operating system; and a timer at the network interface device;

wherein the network interface device is configured to transmit the data and, on receiving an acknowledgement for the data, write the acknowledgement to an area of the memory accessible to the application and start a timer corresponding to the data;

the network interface device being further configured to:

if the application accesses the acknowledgement, cancel the timer; or if the timer reaches a predetermined value, signal the operating system to indicate that the application is unresponsive, wherein the processor subsystem is in communication with the memory via a bus and the network interface is in communication with the memory via a bus.

22. A method for transmitting or receiving data by means of a data processing system having a processor subsystem, the system supporting an operating system and an application and having access to a memory and a network interface device capable of supporting a communication link over a network with another network interface device, the method comprising:

allocating one or more areas of the memory for use as data buffers and connection state in the transfer of data between the data processing system and the network interface device; and directly accessing at least one of the areas of the memory by means of the application, executing on the processor subsystem, for at least one of a data transmission operation by means of the network interface device and a data reception operation by means of the network interface device;

if the application is determined to be unresponsive, the network interface device signaling the operating system to access the said at least one of the areas of the memory; and in response to the signal, the operating system, executing on the processor subsystem, directly accessing at least one of the data buffers and connection state for continuing the at least one transmission or reception operation by means of the network interface device, wherein the processor subsystem is in communication with the memory via a bus and the network interface is in communication with the memory via a bus.

23. A method as claimed in claim 22, wherein the method comprises:

receiving data from the network by means of the network device; and writing that data to the said at least one of the areas of the memory by means of the network device.

24. A method as claimed in claim 23, wherein the network device supports a timer and the method comprises starting the timer to count from a preset initial value when received data is written to the said at least one of the areas, and the application is determined to be unresponsive if the timer reaches a preset final value.

25. A method as claimed in claim 24, comprising the step of setting the initial value and/or the final value by means of the application.

26. A method as claimed in claim 24 or 25, comprising stopping the timer by means of the application on reading received data by means of the application from the said at least one of the areas.

27. A method as claimed in any of claim 22, 23, 24 or 25, wherein each of the said steps of directly accessing at least one of the areas of the memory for the data reception operation by means of the network interface device comprises protocol processing data received from the network by the network interface device and stored in the said at least one of the areas.

28. A method as claimed in claim 27, wherein the step of protocol processing comprises extracting traffic data from the received data.

29. A method as claimed in claim 27, wherein the step of protocol processing comprises causing the network interface device to transmit an acknowledgement and/or re-transmit message over the network in respect of at least some of the received data.

30. A method as claimed in claim 22, wherein the method comprises:
   reading data from the said at least one of the areas by means of the network device; and
   transmitting that data over the network by means of the network device.

31. A method as claimed in claim 30, wherein each of the said steps of directly accessing at least one of the areas of the memory comprises storing data for transmission in the said at least one of the areas.

32. A method as claimed in claim 30 or 31, wherein each of the said steps of directly accessing at least one of the areas of the memory comprises triggering the network interface device to perform the said step of reading data from the said at least one of the areas.

33. A method as claimed in claim 32, wherein the network device supports a timer and the method comprises starting the timer to count from a preset initial value when the application is signaled by the network interface device that received data has been written to the said at least one of the areas, and the application is determined to be unresponsive if the timer reaches a preset final value.

34. A method as claimed in claim 33, comprising the step of setting the initial value and/or the final value by means of the application.

35. A system for transmitting or receiving data, the system comprising:
   a data processing system having a processor subsystem and supporting an operating system and an application and having access to a memory, one or more areas of which are allocated for use for data buffers and connection state in the transfer of data between the data processing system and the network interface device; and
   a network interface device capable of supporting a connection over a network with another network interface device and configured to signal the operating system if the application is determined to be unresponsive;
   wherein the application is configured to, while executing on the processor subsystem, directly access at least one of the data buffers and connection state for at least one of a data transmission operation by means of the network interface device and a data reception operation by means of the network interface device, and the operating system is configured to, while executing on the processor subsystem and in response to said signal from the network interface device, directly access the said at least one of the data buffers and connection state for continuing the at least one transmission or reception operation by means of the network interface device,
   wherein the processor subsystem is in communication with the memory via a bus and the network interface is in communication with the memory via a bus.

36. A method as claimed in claim 7, wherein each of the timers is run on the network interface device.

37. A data processing system as claimed in claim 13, wherein the operating system is capable of direct communication with the network interface device.

38. A data processing system as claimed in claim 37, wherein the said direct communication between the non-operating-system functionality bypasses the operating system.

39. A data processing system as claimed in claim 13, wherein the non-operating-system functionality is a transport library.

40. A data processing system as claimed in claim 13, wherein the said area of the memory is mapped to a second area of the memory, and the second area of the memory is accessible to the operating system but not directly accessible to the non-operating-system functionality.

41. A data processing system as claimed in claim 13, wherein the network interface device is configured to, on a transmission operation of data being initiated over the network, start a timer; and, if the timer reaches a predetermined value before an acknowledgement is received for that data, transmit a failure message to the data processing system.

42. A data processing system as claimed in claim 13, wherein, on a transmission operation of data over the network being initiated, a record of that operation and an indication of the application that was the source of the data is stored; and the network interface device is configured to, on receiving data for that application, start a timer for each record associated with that application; and, if such a timer reaches a predetermined value before an acknowledgement is received for that data, transmit a failure message to the data processing system.

43. A data processing system as claimed in claim 41, wherein the or each timer is run on the network interface device.

44. A data processing system as claimed in claim 42, wherein the application is configured to cancel the timer on receiving an acknowledgement for the data, and wherein the or each failure message is directed to the operating system.

45. A data processing system as claimed in claim 44, wherein the application is configured to cancel the timer by signaling the entity on which the timer is run in a manner that bypasses the operating system.

46. A data processing system as claimed in claim 41, wherein the failure message is directed to the application that was the source of the data.

47. A data processing system as claimed in claim 46, wherein the operating system is configured to be responsive to failure messages that are directed to applications that are no longer in communication with the network device and to continue the transmission operation in respect of data corresponding to the failure message.

48. A system as claimed in claim 21, wherein the non-operating-system functionality is a transport library.

49. A system as claimed in claim 21, wherein the said signaling comprises applying a failure event to an event queue of the operating system.

50. A system as claimed in claim 21, the operating system being configured to, in response to being signaled, communicate with the network interface device to advance communication with the said another network device.

51. A system as claimed in claim 35, wherein the network interface device is configured to, on receiving data from the network, write that data to the said at least one of the areas of the memory.

52. A system as claimed in claim 51, wherein the network interface device supports a timer and is configured to start the timer to count from a preset initial value when received data is written to the said at least one of the areas, and the application is determined to be unresponsive if the timer reaches a preset final value.

53. A system as claimed in claim 52, wherein the application is configured to set the initial value and/or the final value.

54. A system as claimed in claim 52, wherein the application is configured to stop the timer on reading received data from the said at least one of the areas.

55. A system as claimed in claim 35, wherein the application and operating system are configured to, on directly accessing at least one of the areas of the memory for a data reception operation by means of the network interface device, protocol process data received from the network by the network interface device and stored in the said at least one of the areas.

56. A system as claimed in claim 55, wherein the protocol processing comprises extracting traffic data from the received data.

57. A system as claimed in claim 55, wherein the protocol processing comprises causing the network interface device to transmit an acknowledgement and/or re-transmit message over the network in respect of at least some of the received data.

58. A system as claimed in claim 35, wherein the network interface device is configured to, on transmitting data over the network, read data from the said at least one of the areas.

59. A system as claimed in claim 58, wherein the application and operating system are configured to, on directly accessing at least one of the areas of the memory for a data transmission operation by means of the network interface device, store data for transmission in the said at least one of the areas.

60. A system as claimed in claim 58, wherein the application and operating system are configured to, on directly accessing at least one of the areas of the memory for a data transmission operation by means of the network interface device, trigger the network interface device to read data from the said at least one of the areas.

61. A system as claimed in claim 60, wherein the network interface device supports a timer and is configured to, when the network interface device signals the application that received data has been written to the said at least one of the areas, start the timer to count from a preset initial value; the application being determined to be unresponsive if the timer reaches a preset final value.

62. A system as claimed in claim 61, wherein the application is configured to set the initial value and/or the final value.

63. A system as claimed in claim 16, wherein the operating system is arranged to automatically read received data from the data buffer on a determination being made that the application is unable to communicate with the network device.

* * * * *